July 3, 1928.

E. A. GUSTAFSON

CALIBRATION

Filed April 28, 1926

1,675,604

Inventor
Edwin A. Gustafson

By Blackmore, Spencer & Flint
Attorney

Patented July 3, 1928.

1,675,604

UNITED STATES PATENT OFFICE.

EDWIN A. GUSTAFSON, OF FLINT, MICHIGAN, ASSIGNOR TO A C SPARK PLUG COMPANY, OF FLINT, MICHIGAN, A COMPANY OF MICHIGAN.

CALIBRATION.

Application filed April 28, 1926. Serial No. 105,137.

This invention relates to measuring instruments wherein the extent of rotation of a speed cup is dependent upon the intensity of a magnetic field. The invention is intended particularly for speedometers but its use in other magnetically controlled instruments will be obvious.

The operation of such an instrument on motor vehicles is well known. By suitable flexible shafting connected to the part, the rotation of which is to be measured, a rotor member is rotated between the poles of a magnet. The influence upon the magnetic lines of force is such as to cause a like rotation of a drag member or speed cup also located between the magnet poles and embracing the rotor. The movement of this speed cup is obviously dependent upon the intensity of the magnetic field.

An object of this invention is to provide means to modify the intensity of the magnetic field. A further object is to provide for making changes in the intensity of the magnetic field by a simple manual adjustment. The drawing illustrates a preferred form of embodiment.

Figure 1:
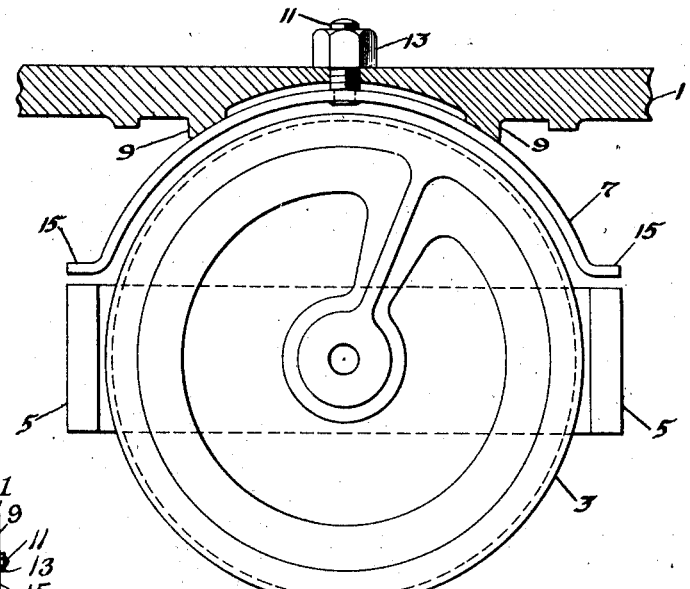
Figure 1 is a top plan of the speedometer.
Figure 3:
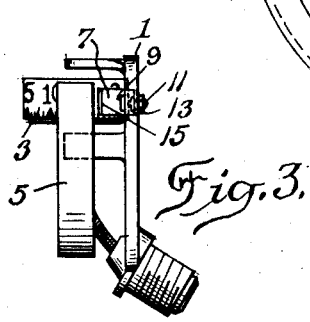
Fig. 3 is a side elevation.

Referring by reference characters to the drawing, numeral 1 represents a part of a frame which carries the speedometer structure. The speed cup is represented by 3 and the poles of the magnet are shown at 5.

It will be understood that the driven rotor is also mounted between the magnet poles and within the speed cup. Suitable figures, not shown, on the speed cup indicate the rate of speed of the vehicle.

Figure 2:
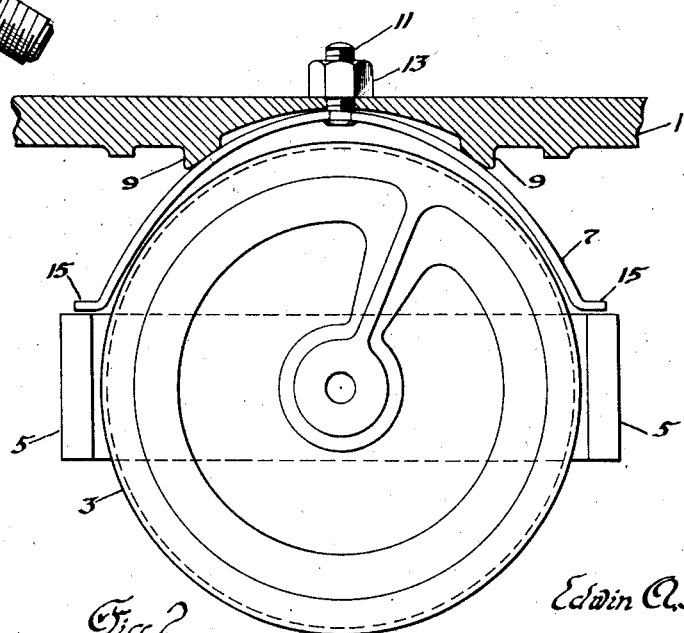
Figure 2 is a similar view of the same with the parts in a different position of adjustment.

For the purpose of controlling the intensity of the magnetic field across the rotor, and, therefore, the extent of rotation of the speed cup, the following mechanism is employed. A semicircular ring member 7 of magnetic material engages the frame member 1 at two raised parts 9. Between these parts 9 the frame is of arc shape corresponding to the curvature of the member 7. Secured to the central part of 7 is a screw threaded member 11, which passes through the frame 1, as shown. Upon part 11 is threaded a nut 13. From Figure 1 it will be observed that the flattened ends 15 of member 7 lie near, but are spaced from the magnet poles. If, now, the nut be turned down upon the threaded member 11, the member 7 will be sprung into the distorted position shown in Figure 2 where the central part of the arc shaped member 7 is drawn up against the frame 1, and the ends 15 are thereby brought closely adjacent the magnet poles.

The member 7 of magnetic material functions as a shunt, the influence of which is obviously variable and dependent upon the proximity of its ends to the poles of the magnet. Inaccuracies in the reading of the speed cup arising from the effects of temperature changes, or from other causes, are very easily corrected by the adjustment of nut 13 which changes the effectiveness of part 7 as a shunt.

I claim:

1. In a measuring instrument, a magnet, a magnet shunt having its ends positioned one adjacent each pole of the magnet, means including fixed fulcrums and a single intermediate adjusting member to distort the shape of the shunt to vary the spacing of its ends from the poles.

2. The combination set forth in claim 1 wherein the last named means comprises a frame with two points of which the shunt engages and between which an adjustable member engages the shunt.

3. In a measuring instrument, a magnet having poles, an indicating member rotatable between said poles in a plane at right angles to the plane of said magnet, a shunt in a plane substantially the same as the plane of the indicating member, means to adjust the shunt to vary the spacing of its ends from the magnet poles.

4. A frame, an indicating member, a magnet with its poles adjacent the indicating member, a shunt engaging the frame at two spaced fulcrum points thereon, movable means associated with the frame between said points and secured to said shunt whereby the spacing of the shunt adjacent the magnet poles may be varied.

5. In a measuring instrument, a magnet, an indicating member between its poles and positioned in a plane substantially at right angles to the plane of the magnet, a shunt substantially in the plane of said member at least one of its ends movable relative to a magnet pole.

6. In a magnetic measuring instrument, a magnet having poles, a shunt therefor comprising an elongated plate mounted in fixed relation to said magnet and having its ends adjacent said poles and outside the interpolar gap, means engaging said shunt intermediate its ends to adjustably vary the distance between said ends and the magnet poles.

7. In a magnetic measuring instrument, a rotary indicating means, a magnet having its poles positioned diametrically with reference to said indicating means, and an elongated plate serving as a shunt, said plate having its ends positioned outside the interpolar gap and adjacent said poles, and means intermediate said ends and engaging the said shunt to adjustably vary the distance between the poles and the ends of the shunt.

In testimony whereof I affix my signature.

EDWIN A. GUSTAFSON.